United States Patent
Jehangir et al.

(10) Patent No.: US 9,963,212 B2
(45) Date of Patent: May 8, 2018

(54) SUBMERSIBLE ELECTRIC THRUSTER

(71) Applicant: Blue Robotics Inc., Torrance, CA (US)

(72) Inventors: Rustom Friedrich Jehangir, Redondo Beach, CA (US); Joseph Anthony Spadola, El Segundo, CA (US)

(73) Assignee: Blue Robotics Inc., Torrance, CA (US)

( * ) Notice: Subject to any disclaimer, the term of this patent is extended or adjusted under 35 U.S.C. 154(b) by 350 days.

(21) Appl. No.: 14/699,478

(22) Filed: Apr. 29, 2015

(65) Prior Publication Data
US 2015/0314849 A1 Nov. 5, 2015

Related U.S. Application Data

(60) Provisional application No. 61/986,945, filed on May 1, 2014.

(51) Int. Cl.
B63H 21/17 (2006.01)
B63H 5/14 (2006.01)
(Continued)

(52) U.S. Cl.
CPC ............... B63H 5/14 (2013.01); B63H 1/20 (2013.01); B63H 5/15 (2013.01); B63H 21/17 (2013.01);
(Continued)

(58) Field of Classification Search
CPC .......... H02K 11/33; H02K 5/04; H02K 1/187; H02K 5/132; H02K 7/085; H02K 5/1285;
(Continued)

(56) References Cited

U.S. PATENT DOCUMENTS 3,885,516 A * 5/1975 Uroshevich .............. B63H 5/14
440/61 T
5,252,875 A 10/1993 Veronesi et al.
(Continued)

FOREIGN PATENT DOCUMENTS

GB 2476879 7/2011
KR 20110051894 5/2011

OTHER PUBLICATIONS

International Preliminary Report on Patentability for corresponding International Application No. PCT/US2015/028258 dated Nov. 10, 2016.
(Continued)

Primary Examiner — Peter J Bertheaud
Assistant Examiner — Dnyanesh Kasture
(74) Attorney, Agent, or Firm — Renner, Otto, Boisselle & Sklar, LLP

(57) ABSTRACT

A submersible electric thruster operable to propel underwater vehicles, surface vehicles, amphibious vehicles, etc. The submersible electric thruster includes a stator assembly having a base, stator, windings, and bearings and an external rotor assembly having a cylindrical arrangement of permanent magnets with a hub that is secured to a shaft. The stator forms the center of the motor and the permanent magnets spin around the stator. A propeller hub is integrally connected to the rotor assembly with angularly spaced propeller blades extending radially from the propeller hub. An annular nozzle surrounds the propeller and motor, forming an inlet and outlet for water flow. A nose cone is connected to the stator assembly and a tail cone is integrally connected to the nozzle assembly. Supporting arms may extend from the stator assembly to support the nozzle and/or supporting arms may extend from the nozzle to the support the tail cone.

19 Claims, 5 Drawing Sheets

EXPLODED VIEW

(51) Int. Cl.
    *B63H 21/00*      (2006.01)
    *B63H 1/20*      (2006.01)
    *B63H 5/15*      (2006.01)
    *B63H 21/21*      (2006.01)
    *H02K 1/17*      (2006.01)
    *H02K 7/08*      (2006.01)
    *H02K 5/128*      (2006.01)
    *H02K 1/18*      (2006.01)
    *H02K 5/04*      (2006.01)
    *H02K 5/132*      (2006.01)
    *H02K 11/33*      (2016.01)
    *B63H 23/24*      (2006.01)
    *B63H 5/125*      (2006.01)

(52) U.S. Cl.
    CPC .............. *B63H 21/21* (2013.01); *B63H 21/24* (2013.01); *H02K 1/17* (2013.01); *H02K 1/187* (2013.01); *H02K 5/04* (2013.01); *H02K 5/1285* (2013.01); *H02K 5/132* (2013.01); *H02K 7/08* (2013.01); *H02K 7/085* (2013.01); *H02K 11/33* (2016.01); *B63H 23/24* (2013.01); *B63H 2005/1258* (2013.01); *B63H 2021/216* (2013.01)

(58) Field of Classification Search
    CPC ... H02K 1/17; H02K 7/08; B63H 5/14; B63H 5/15; B63H 1/20; B63H 21/24; B63H 21/21; B63H 21/17; B63H 23/24; B63H 2005/1258; B63H 2021/216
    See application file for complete search history.

(56) References Cited

U.S. PATENT DOCUMENTS

| | | | |
|---|---|---|---|
| 6,837,757 | B2 | 1/2005 | Van Dine et al. |
| 7,554,228 | B2* | 6/2009 | Franz .................... F04D 29/542 310/63 |
| 8,512,084 | B1 | 8/2013 | Chang et al. |
| 2003/0194922 | A1 | 10/2003 | Van Dine et al. |
| 2007/0085426 | A1* | 4/2007 | Lee .......................... H02K 1/04 310/43 |
| 2007/0252458 | A1* | 11/2007 | Chen .......................... F04D 3/00 310/87 |
| 2008/0245924 | A1* | 10/2008 | Arlton ................... B64C 39/024 244/17.13 |
| 2014/0012236 | A1* | 1/2014 | Williams ......... A61B 17/07207 606/1 |

OTHER PUBLICATIONS

International Search Report and Written Opinion for corresponding International Application No. PCT/US2015/028258 dated Jul. 24, 2015.

* cited by examiner

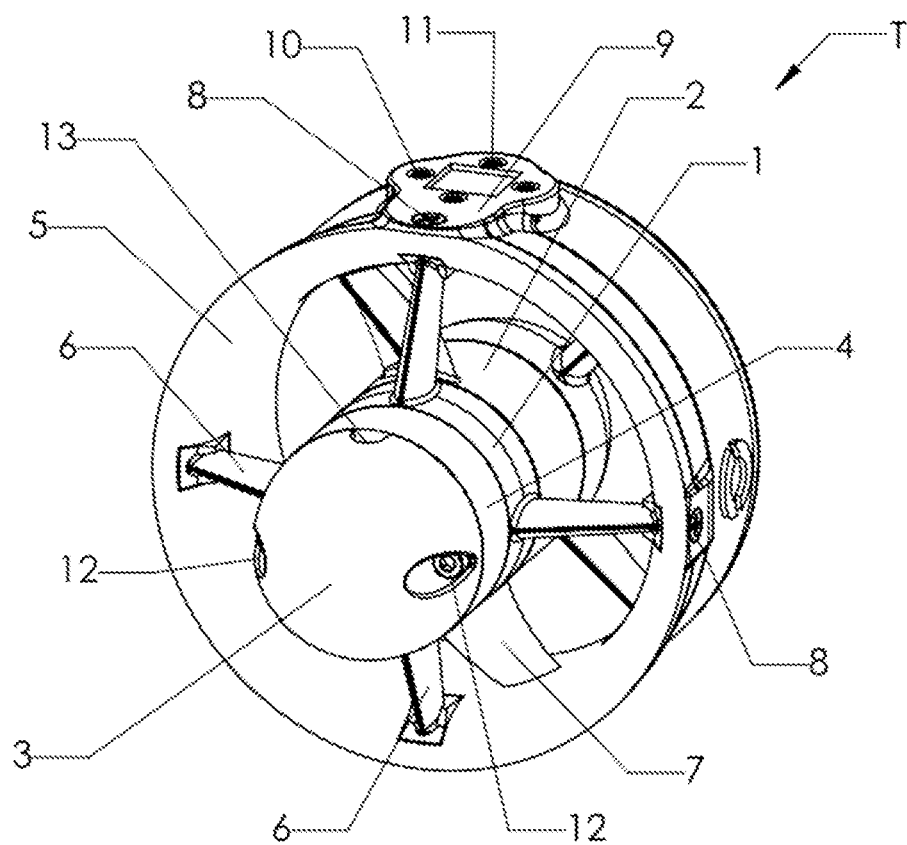
FIG. 1 ISOMETRIC VIEW

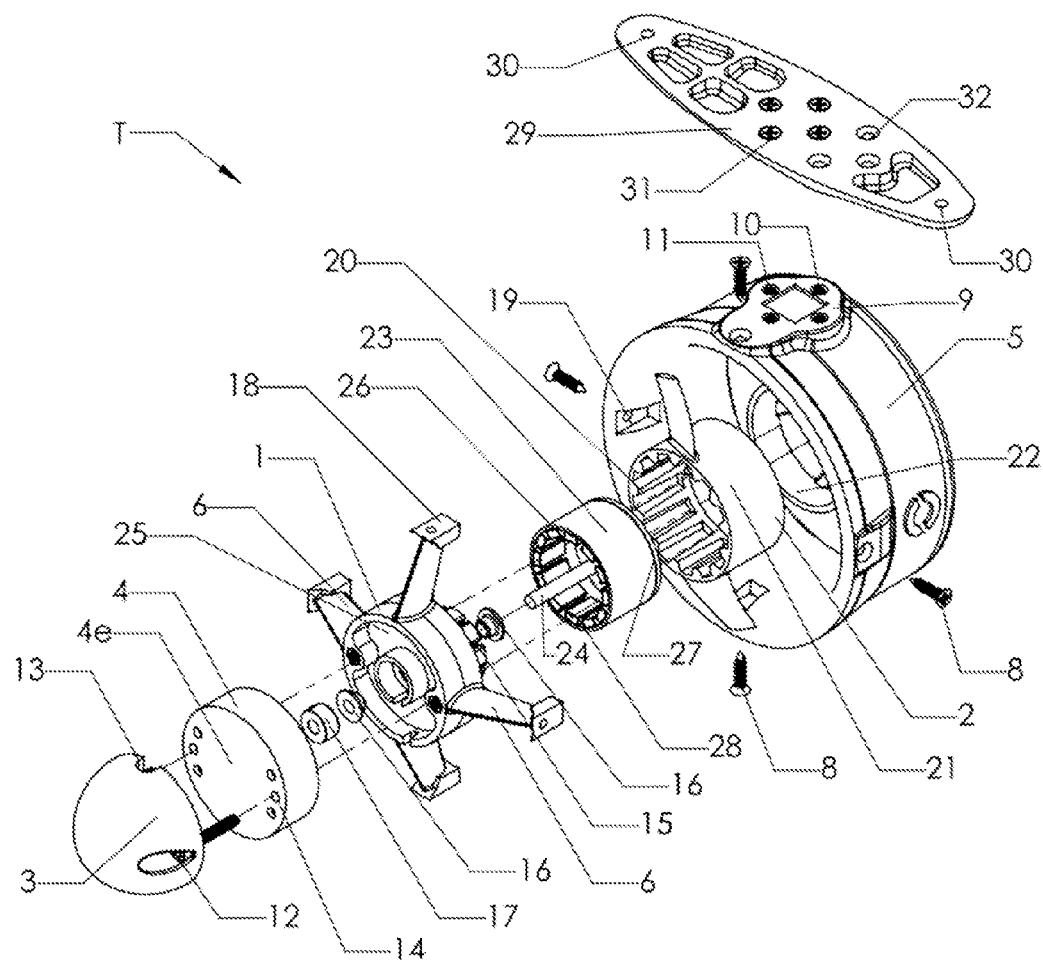
FIG. 2 EXPLODED VIEW

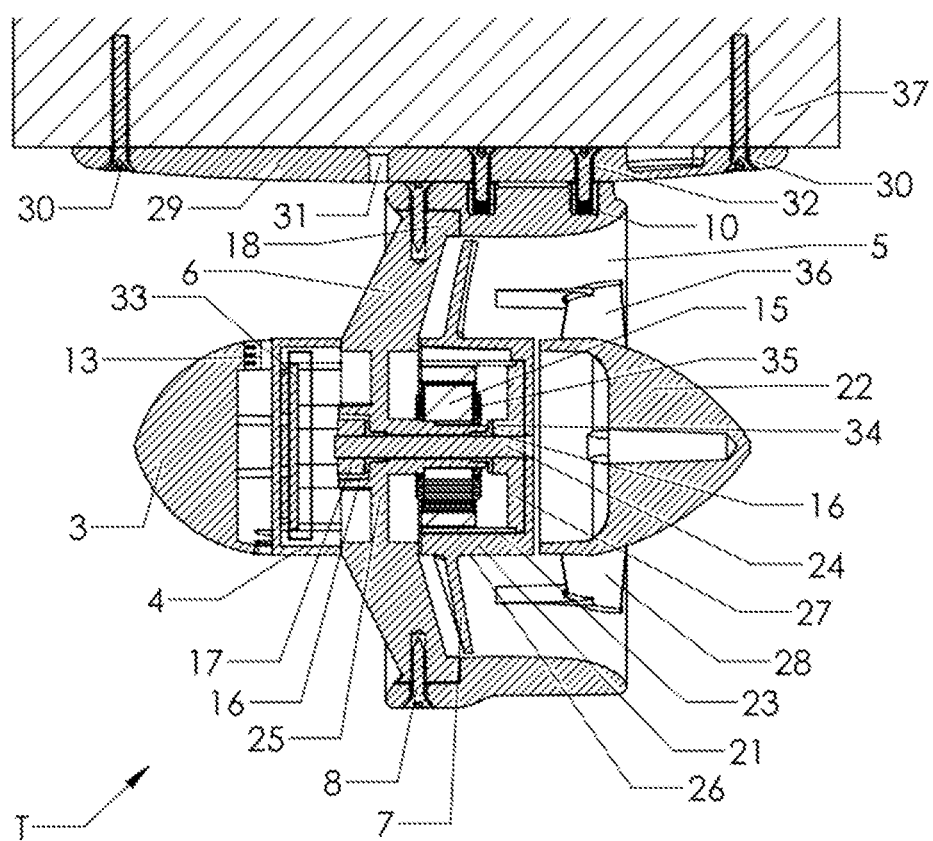
FIG. 3 CROSS SECTION VIEW

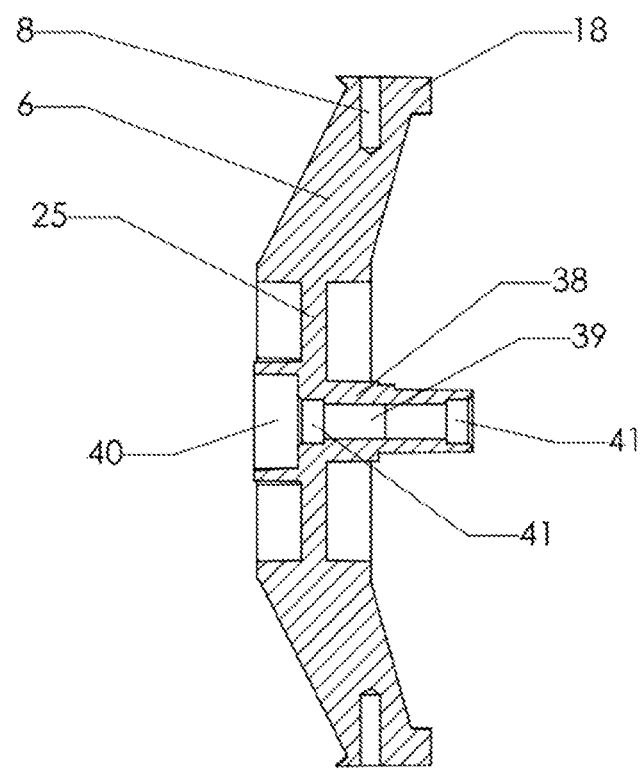
FIG. 4 BASE, NOZZLE ARMS, AND BEARING TUBE CROSS SECTION VIEW

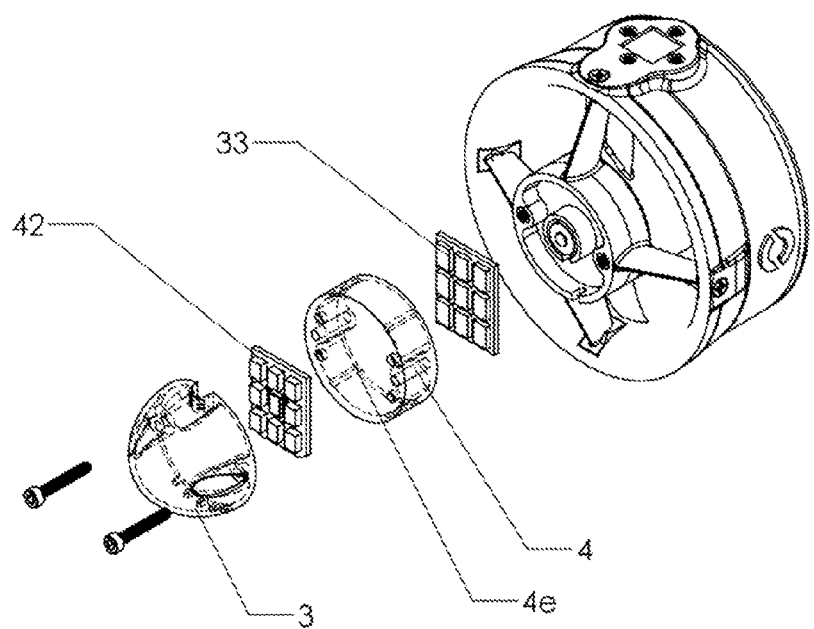
FIG. 5 EXPLODED VIEW WITH ELECTRONICS UNIT AND NOSE CONE LED

SUBMERSIBLE ELECTRIC THRUSTER

Priority is claimed from U.S. Provisional Patent Application No. 61/986,945, filed May 1, 2014, the entire disclosure of which hereby is incorporated by reference.

FIELD OF THE INVENTION

The present invention relates to a thruster and in particular to a submersible electric thruster.

The invention is a unique design that has a low number of parts, no enclosed air or oil cavities, and requires minimal maintenance.

BACKGROUND OF THE INVENTION

Unmanned and robotic marine vehicles, such as remotely operated underwater vehicles (ROVs), autonomous underwater vehicles (AUVs), and autonomous surface vessels (ASVs), have become invaluable tools for marine exploration. They are commonly used for scientific, industrial, commercial, and recreational purposes. These vehicles generally use thrusters for propulsion.

A thruster is a device which provides a thrust force for propulsion or control of a vehicle. Generally, thrusters have an electric motor that is enclosed to seal it from water, a propeller rotatably connected to the motor through a mechanical seal or magnetic coupling, and a nozzle that protects the propeller and increases the thrust of the propeller. Thrusters often use oil compensation to allow operation at greater depths. U.S. Pat. No. 6,837,757 and U.S. Pat. No. 8,512,084 describe various embodiments of such devices.

Electric thrusters are powered through an electrical wire that connects the motor to a power source. In most cases, for variable thrust control, the power is supplied through an electronic speed controller. Such controllers are available for different types of motors such as brushed motors and brushless motors.

Synchronous electric motors are commonly used in a wide variety of applications. The thruster described here uses such a motor in the form of an external rotor brushless permanent magnet motor that is similar to those commonly used on model aircraft and computer disk drives. This motor design provides high torque at low rotational speeds without the need for a gearbox or reduction drive. It is simple and comprises a single moving part. The stator and motor windings are at the core of the motor and the permanent magnets are arranged in a radial pattern around the stator. Such motors typically have three phase magnetic windings that are commutated by an electronic speed controller. Sensorless feedback is used by the controller for proper timing of the commutation.

Common thruster designs are generally very large compared to an electric motor of equivalent power that is not sealed from the water. This is a driving factor in the design of many applications such as ROVs. The thrusters of an ROV (remotely operated underwater vehicle) often take up a significant portion of the total vehicle volume.

Electric thrusters are generally limited to depths of around 300-3,000 feet because they have air- or oil-filled cavities that are affected by the very high pressures experienced at depth. The vast majority of the ocean floor is at a much greater depth than this.

Electric thrusters, and in particular those that use mechanical seals, require maintenance as often as every 50 hours of operation to replace seals and add grease. Most ROVs have between three to six thrusters, making maintenance a laborious task. Additionally, for long endurance applications, such as long-endurance ASVs and AUVs, routine maintenance is not an option as the vehicles could be operated for months at a time.

Last, currently available thrusters are prohibitively expensive and consequently restricted from use in many applications such as hobby use, academic use, and small business commercial use. Much of the cost is driven by the complexity and number of parts used in typical designs.

SUMMARY OF THE INVENTION

An aspect of this disclosure relates to a thruster that is small to enable more compact vehicle designs.

Another aspect relates to a thruster that operates at the full depth of the ocean.

Another aspect relates to a thruster that requires zero or minimal maintenance and is able to operate for extended periods of time.

Another aspect relates to a thruster that is affordable for hobbyist, academic, and commercial purposes.

Another aspect relates to a thruster design described here that is a unique approach that addresses all of the above needs.

Another aspect relates to a submersible electric thruster that is compact, operable at high pressures, and operable continuously without maintenance.

Another aspect relates to a submersible electric thruster including one or more of the following and/or a combination of all of the following:

a stator assembly with a base that is an attachment point for other parts of the thruster, a bearing tube that supports the stator and contains the bearings, a ferrous stator mounted on the bearing tube, electromagnetic windings, and a protective coating that completely covers the stator and windings preventing contact with the water;

a rotor assembly with a shaft, a ferrous ring, and a multiplicity of magnets mounted within the ring so that the inner diameter of the magnets is slightly larger than the outer diameter of the stator;

a propeller with a central hub that has an inner diameter slightly larger than the outer diameter of the rotor assembly and is connected co-rotatably about the rotor assembly so that the propeller blades extend radially from the rotational axis of the rotor;

a nose cone that is connected to the front of the thruster;

an electronics unit connected between the stator assembly and the nose cone that contains an electronic speed controller sealed in a protective coating;

an annular nozzle with an inner diameter slightly larger than the diameter circumscribed by the tip of the propeller providing an inlet and outlet for water flow;

a tail cone that is positioned at the rear of the thruster; and a mounting bracket that is securable to the outside of the nozzle and is securable to other surfaces, such as the hull of a vehicle.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments.

Moreover, in the drawings, like reference numerals designate corresponding parts throughout the several views and may be used to designate like or similar parts in more than one embodiment. Also, primed reference numerals may be used to designate parts that are similar to parts designated by the same unprimed reference numeral.

BRIEF DESCRIPTION OF THE DRAWINGS

For a more complete understanding of the invention, reference is made to the following description and accompanying drawings that are not necessarily to scale, in which:

FIG. 1 is an assembled perspective view of an embodiment of a submersible electric thruster according to the invention;

FIG. 2 is an exploded perspective view of the embodiment;

FIG. 3 is a sectional view of the embodiment; and

FIG. 4 is a sectional view showing only the base, nozzle arms, and bearing tube of the embodiment.

FIG. 5 is an exploded perspective view of an embodiment including an electronics unit, an electronic speed controller, and an electronic printed circuit board in the nose cone.

DETAILED DESCRIPTION OF THE PREFERRED EMBODIMENTS

The present embodiments generally relate to a submersible electric thruster that has a number of unique benefits including a compact size, operability at the full depth of the ocean, zero or minimal required maintenance, low number of parts, and low cost relative to currently available alternatives. Unlike most thrusters, which generally consist of a motor disposed in an air or oil filled cavity and connected to a propeller through a mechanical or magnetic connection, the present invention uses a novel design that seals the individual components of the motor without creating any cavities or requiring seals or magnetic couplings. In addition to reducing the size and number of parts, this allows the thruster to operate at extreme pressures at the bottom of the ocean without issue and to operate continuously for extended periods of time without maintenance. These unique features combined with the low number of parts and overall simplicity of the design produce a thruster that is more capable than available alternatives at a significantly lower cost. An embodiment of the invention may be priced to allow hobbyists and students to enter the field of marine robotics, which has traditionally been prohibitively expensive.

The present invention is suitable for a wide variety of applications for manned and/or robotic marine vehicles. As an example, an embodiment of the invention may be used to propel and control an ROV (remotely operated underwater vehicle). Such a vehicle could be designed to operate at the deepest parts of the ocean to explore and study parts of the earth that have never been explored. Such exploration has been limited by the prohibitively high costs of appropriate equipment. The thrusters of the present invention would allow the propulsion system of the vehicle to be capable of operation at such depths at a minimal cost and level of complexity. Similarly, the thrusters of the present invention could provide an affordable propulsion system to a hobbyist or student seeking to build an ROV with a small budget, enabling a wide range of people to access such vehicles. Additionally, the compact size of the present invention compared to available alternatives would allow more compact vehicle designs. As a further example, an embodiment of the invention may be used to propel and control an ASV (autonomous surface vessel). The ASV could be equipped with a source of electrical power such as solar cells, wind generators, and/or fuel cells as well as sensors and communication equipment to collect and transmit data. The unique design of the present invention would allow the propulsion system of such a vehicle to operate continuously for months or years at a time without maintenance. Such a vehicle may provide meteorological data, oceanographic data, sonar data for sea floor mapping, or other data that benefits knowledge of the world's oceans.

As shown in FIG. 1, FIG. 2, and FIG. 3, an embodiment of a submersible electric thruster T according to the present invention includes a stator assembly 1, a rotor assembly 26, a propeller 2, a nose cone 3, an electronics unit 4, a nozzle 5, a tail cone 22, and a mounting bracket 29.

The stator assembly 1 includes a base 25, a bearing tube 38, bearings 16, a stator 15, electromagnetic windings 35, and a protective coating around the stator and windings. As illustrated in FIG. 4, the base 25 and bearing tube 38 are molded as a single part and the base has four arms 6 that extend to support the nozzle 5. The arms 6 are shaped for low drag using a hydrofoil shape. The end of each arm has a nozzle attachment point 18 that fits into a matching recess 19 on the nozzle.

The bearing tube 38 has a primary inner diameter 39 that is slightly larger than the rotor shaft 24 as well as a larger secondary inner diameter 41 at each end to house the bearings 16. A tertiary inner diameter 40 is slightly larger than the outer diameter of the shaft collar 17 and is positioned at one end of the bearing tube to shield the shaft collar from contact with wires that may be present between the stator assembly 1 and the electronics unit 4 or the nose cone 3. The bearings 16 are high-performance plastic sleeve bearings or bronze sleeve bearings such as Oilite bearings. The bearings may be flanged bearings as shown in the figures of the preferred embodiment or non-flanged bearings. The bearing tube 38 supports the stator 15.

The stator 15 is made of thin laminations of low-carbon steel, as is common in the construction of electric motors. The stator is coated with a protective coating to prevent electrical shorts between the windings and the stator. In this embodiment of the invention the stator has nine arms but it may use a stator with fewer or more arms. The windings are made of copper magnet wire, as commonly used in the construction of electric motors, and are wound in three phases. A common "Wye" or "Y" termination style is used to provide high torque output. The stator and windings are protected from abrasion and corrosion with a protective coating. As an example, in this embodiment of the invention, the protective coating is an epoxy compound and the stator and windings are dipped in the epoxy allowing the protective coating to fill small air gaps between the windings. A vacuum degassing method is used to ensure that there are no air bubbles trapped in the coating. If such air bubbles existed, they would compress at high pressures and could compromise the strength of the protective coating. Other protective coatings also or alternatively may be used. Alternatively, the stator may be overmolded with a plastic coating for protection. This could be done though injection molding or other plastic fabrication techniques.

The rotor assembly 26 includes a shaft 24, a ferrous ring 23, a rotor base 27, and a multiplicity of permanent magnets 28. The rotor base 27 connects the shaft to the ferrous ring 23 and magnets 28. It is constructed of aluminum. The shaft 24 extends from the rotor base 27 so that when the rotor assembly is installed on the stator assembly 1 the shaft extends through and beyond the length of the bearing tube. When the propeller produces thrust in the forward direction, the rotor base 27 is pressed against the bearing 16. The rotor base 27 has a bearing stand-off 34 to allow room for the electromagnetic windings to extended beyond the stator. A shaft collar 17 is fixed to the end of the shaft that extends through the bearing tube 38. When the propeller produces thrust in the reverse direction, the shaft collar is pressed against the bearing 16. The ferrous ring 23 is connected to the rotor base 27 and extends in the same direction as the shaft 24 so that when the rotor assembly is installed on the stator assembly 1 the ferrous ring 23 extends to overlap the stator assembly. The multiplicity of permanent magnets 28 is arranged about the inner surface of the ferrous ring 23. In this exemplary embodiment of the invention, twelve magnets are used, but a different number of magnets may be used to change the performance characteristics of the thruster. The magnets 28 are arranged so that center of the respective magnets is in line with the axial center of the stator 15. Adjacent magnets are installed with opposite magnetic polarity. The ferrous ring 23 acts to contain and focus the magnetic flux of the permanent magnets and the magnetic flux of the stator and windings.

The propeller 2 is connected to the rotor and converts rotational kinetic energy into thrust. The propeller includes a hub 21 and a multiplicity of blades 7. The propeller hub 21 is cylindrical and closed at one end. Its inner diameter is slightly larger than the outer diameter of the rotor assembly 26 and its length is such that when the propeller 2 is installed on the rotor assembly the propeller and ferrous ring 23 are flush. The inner wall of the hub has slots 20 that reduce the amount of material needed to manufacture the propeller. The closed end of the propeller hub has two holes so that screws can be used to fix the propeller to the rotor assembly 26. The propeller may be designed to spin in the clockwise or counterclockwise direction to provide opposite torque forces that may cancel in applications with multiple thrusters. The propeller blades may be designed to be flexible so that they may bend to relieve foreign objects that are caught in the thruster.

The nose cone 3 is connected to the front of the thruster to minimize drag. The nose cone has two nose cone mounting holes 12, allowing screws to be used to attach the nose cone to the stator assembly 1. Additional pieces such as the electronics unit 4 can be attached between the stator assembly 1 and the nose cone 3. A wire hole 13 is included in the nose cone to allow the wires necessary to power and control the thruster T to extend outside of the thruster body. In one embodiment of the invention, the nose cone is built of an optically translucent or transparent material and a light emitting diode (LED) is contained in the nose cone to provide a light for the submersible vehicle as shown in FIG. 5. The LED may be attached to a printed circuit board (PCB) 42 and other components such as LED controllers may be included on said PCB. The LED may be of the red-green-blue (RGB) type so that with an appropriate LED controller, the light may produce a wide range of colors. Alternatively, the nose cone may house a camera or other electronic sensor. The nose cone 3 may also be replaced with a mounting bracket so that the thruster can be mounted to a surface parallel to the plane of propeller rotation. The nose cone includes several small holes or slots that act as vents to allow water to enter and exit the nose cone.

The electronics unit 4 is cylindrical with a closed end 4e. The outer diameter of the electronics unit is more or less equal to the outer diameter of the stator assembly base 25 so that when the electronics unit is installed between the stator assembly and the nose cone 3 the outer surfaces are flush. The electronics unit has two holes 14 that allow screws to secure the nose cone and electronics unit to the stator assembly simultaneously. A brushless electronic speed controller 33, which includes a PCB (printed circuit board) and electronic components, is disposed within the electronics unit. The PCB and/or electronic components are protected from electrical shorts, abrasion, and corrosion by a protective coating such as an epoxy or silicon potting compound. The protective coating may be of a thermally conductive type so that heat generated by the electronic speed controller is transferred to the electronics unit material. Wires attach to the PCB and protrude from the protective coating to interface with the electromagnetic windings 35 and to provide power and commands. The electronics unit is constructed of a material that allows sufficient thermal conduction to cool the electronic speed controller 33. The electronics unit may be much larger than pictured and may house additional electronics for different purposes.

The electromagnetic windings 35 terminate to three wires, one per electromagnetic phase. The wires pass through a hole in the stator assembly base 25 and the wire ends are disposed in the space between the stator assembly and the electronics unit 4 or the nose cone 3 if the electronics unit is not included. If the electronics unit is used and includes an electronic speed controller, the wires are connected to the electronic speed controller. The power and signal wires for the electronic speed controller connect to a multiconductor cable that passes through the wire hole 13 in the nose cone. If the electronic speed controller is not used, the wires are directly connected to a multiconductor cable that passes through the wire hole 13 in the nose cone. The wire connections are solder connections that are sealed from the water by a plastic coating such as liquid electrical tape or epoxy.

The nozzle 5 is an annular ring with an inner diameter slightly larger than the diameter circumscribed by the propeller tip 2 providing an inlet and outlet for fluid flow. The cross sectional profile of the nozzle 5 is a hydrofoil shape designed to accelerate water speed as it is drawn past the propeller and to reduce propeller tip vortices. The hydrofoil shape may be of a common type such as those of the Kort type. The nozzle is designed to operate well in both forward and backward thruster conditions such as those expected in the normal operation of an ROV. The front of the nozzle has several recesses 19 that mate with the nozzle arms 6 of the stator assembly 1. A set of screw holes 8 allow screws to be used to fasten the nozzle to the stator assembly. The top of the nozzle includes a mounting protrusion 9 that provides threaded holes 10 and a flat surface to interface with the mounting bracket 29 or directly to a surface. The threaded holes 10 contain metal threaded inserts 11 to provide strong threads to interface with screws.

The tail cone 22 is a rounded cone positioned behind the propeller 2 and opposite of the nose cone 3 to reduce drag of the thruster. The tail cone is connected to the nozzle 5 by the tail cone arms 36. The tail cone arms are shaped to minimize hydrodynamic drag. In another embodiment of the invention, the tail cone is fixed to the propeller and there are no tail cone arms.

The mounting bracket 29 provides a mounting interface between the thruster assembly and the mounting surface 37. The mounting bracket is longer than the length of the thruster assembly and is more or less the same width as the nozzle mounting protrusion 9. Its thickness is small compared to its length and width however a thicker version could be made to provide greater distance between the thruster and the mounting surface. Mounting screw holes 30 are located at each end of the mounting bracket and can be used to secure the mounting bracket to the mounting surface. The mounting screw holes are spaced a distance that is greater than the length or width of the thruster assembly so that a screw driver may be used to tighten the screws without interfering with the thruster assembly. A center set of screw holes 31 and a rear set of screw holes 32 provide holes for screws that fix the mounting bracket to the thruster assembly. The center set of screw holes 31 is used when the bracket is mounted in the orientation shown in FIG. 2 so that the mounting screw holes 30 are positioned on either side of the nozzle and can be tightened with a screwdriver. The rear set of screw holes 32 is used when the bracket is mounted in the orientation shown in FIG. 3 so that the mounting screw holes 30 are positioned in front and behind the thruster assembly and can be tightened with a screwdriver. Additionally, the mounting bracket may include a hole to allow the electrical wires to pass through the bracket.

The thruster T has an electronic speed controller. The electronic speed controller 33 can be integrated into the thruster in the electronics unit 4 or may be separate from the thruster. To operate the thruster, an appropriate electrical signal is supplied to the electronic speed controller which in turn provides electricity to the electromagnetic windings 35, which are sealed from the water by a protective coating. The magnetic field that is generated produces a torque on the rotor assembly 26 which is co-rotatably connected to the propeller. As the rotor assembly turns, the electronic speed controller commutates the electrical current through the three phases of the electromagnetic windings to continually produce a torque on the rotor assembly. The back electromotive force is measured and used to sense the position of the rotor for proper timing. Alternatively, a hall effect or other sensor can be used to sense the position of the rotor assembly. The propeller blades 7 act to accelerate water through the nozzle 5 to produce thrust. The structure of the thruster acts to support and contain the rotor assembly and propeller while providing a physical shape that minimizes drag, is compact, and is attachable to a variety of surfaces. When submersed, water floods all cavities within the thruster so that there is no enclosed air and no pressurized cavities.

The embodiment of the invention described here is the preferred embodiment but there are a number of different embodiments. In another embodiment of the invention, the nozzle and its supporting arms are not present. This may be useful for high speed applications where the nozzle loses its effectiveness. The thruster could be mounted from the nose cone or a mounting structure extending from the nose cone. In such embodiment, the tail cone would be connected to the propeller. In another embodiment of the invention, control fins are positioned behind the nozzle to allow control of the vehicle through deflection of the control fins. The tail cone may be excluded in this case. The control fins may be positioned along one or more axes to provide control forces in one or more directions. The control fins may be controlled by electric servos or other means.

The invention is intended for use as a thruster for underwater and surface vehicles but can also be repurposed for other uses. Other uses may include but are not limited to water pumps and liquid mixing. In a further embodiment of the invention a larger propeller is used that is optimized for aerial propulsion. Such a device could be used for aircraft and share the same water resistant characteristics as the thruster.

It is also to be understood that the present invention has been described in connection with what is considered the most practical and preferred embodiment, but that this invention is not limited to the disclosed embodiment but is intended to cover various arrangements included within the spirit and scope of the broadest interpretation so as to encompass all such modifications and equivalent arrangements.

What is claimed:

1. A submersible electric thruster comprising:
   a stator assembly with a stator, electrical windings, bearings, and a base;
   a rotor assembly with a shaft extending through the stator assembly that is connected co-rotatably to a plurality of magnets arranged about the stator that are driven by the electromagnetic forces of the stator and windings;
   a propeller with a central hub that surrounds and is co-rotatably connected to the rotor assembly and with a plurality of angularly spaced propeller blades that extend from said central hub;
   a nose cone that is connected to the stator assembly;
   a nozzle that is connected to the stator assembly and provides an inlet and outlet for water flow;
   a tail cone that is connected to nozzle; and
   at least one chamber containing at least the stator and windings;
   wherein the plurality of magnets of the rotor assembly are arranged radially outwardly of the electrical windings of the stator assembly to thereby rotate about the windings when driven by the electromagnetic forces provided by the stator and windings;
   wherein the at least one chamber containing the stator and windings is configured to be flooded with water when the thruster is submerged; and
   wherein a protective coating encapsulates the stator and windings to prevent water from contacting the stator and windings when the at least one chamber is flooded due to the thruster being submerged, and wherein the protective coating makes direct contact with the flooded water.

2. The thruster of claim 1 further comprising an electronics unit having a motor controller, the electronics unit being connected between the stator assembly and the nose cone, the electronics unit being disposed within one of the at least one chambers of the thruster that is flooded with water when the thruster is submerged, and wherein the electronics unit is sealed from the flooded water by a protective coating that encapsulates the electronics unit and is in direct contact with the flooded water.

3. The thruster of claim 1, further comprising a plurality of supporting arms that connect the stator assembly to the nozzle.

4. The thruster of claim 3 further comprising a plurality of recesses in the nozzle in which are disposed the ends of the supporting arms that connect the stator assembly to the nozzle.

5. The thruster of claim 1, further comprising a plurality of supporting arms that connect the nozzle to the tail cone.

6. The thruster of claim 1, further comprising an external electrical cable that extends through a wire hole included in the nose cone and provides electrical connections for powering and controlling the thruster.

7. The thruster of claim 1, wherein the nosecone is translucent or transparent, and further comprising a light emitting diode and associated electronics disposed in the nose cone.

8. The thruster of claim 1, wherein the nose cone is transparent, and further comprising a camera sensor and associated electronics disposed in the nose cone.

9. The thruster of claim 1, further comprising a protrusion extending from the nozzle providing a flat mounting surface and threaded holes for attachment.

10. The thruster of claim 9 further comprising a mounting bracket with holes to allow fixture to the nozzle and a set of mounting holes to allow fixture to a vehicle.

11. The thruster of claim 10, wherein the mounting bracket is oriented with the mounting holes on either side of the thruster or in front and behind the thruster.

12. The thruster of claim 10, wherein the nosecone is translucent or transparent, and further comprising a light emitting diode and associated electronics disposed in the nose cone.

13. The thruster of claim 10, wherein the nose cone is transparent, and further comprising a camera sensor and associated electronics disposed in the nose cone.

14. The thruster of claim 2, further comprising a plurality of supporting arms that connect the stator assembly to the nozzle upstream of the propeller, the upstream supporting arms having a hydrofoil shape that provides for low drag; and a plurality of supporting arms that connect the tail cone to the nozzle downstream of the propeller, the downstream supporting arms being shaped to minimize hydrodynamic drag.

15. The thruster of claim 14 further comprising a plurality of recesses in the nozzle in which are disposed the ends of the respective upstream and downstream supporting arms.

16. A submersible electric thruster comprising:

a stator assembly with a stator and electrical windings;

a rotor assembly with a shaft extending through the stator assembly that is connected co-rotatably to a plurality of magnets arranged about the stator that are driven by the electromagnetic forces of the stator and windings;

a propeller with a central hub that surrounds and is co-rotatably connected to the rotor assembly and with a plurality of angularly spaced propeller blades that extend from said central hub;

a nose cone that is connected to the stator assembly; and a nozzle that is connected to the stator assembly and provides an inlet and outlet for water flow;

at least one chamber containing at least the stator and windings;

wherein the plurality of magnets of the rotor assembly are arranged radially outwardly of the electrical windings of the stator assembly to thereby rotate about the windings when driven by the electromagnetic forces provided by the stator and windings;

wherein the at least one chamber containing the stator and windings is configured to be flooded with water when the thruster is submerged; and wherein a protective coating encapsulates the stator and windings to prevent water from contacting the stator and windings when the at least one chamber is flooded due to the thruster being submerged, and wherein the protective coating makes direct contact with the flooded water.

17. The thruster of claim 16 further comprising:

a tail cone located toward the rear of the thruster; and an electronics unit having a motor controller, the electronics unit being connected between the stator assembly and the nose cone, the electronics unit being disposed within one of the at least one chambers of the thruster that is flooded with water when the thruster is submerged, and wherein the electronics unit is sealed from the flooded water by a protective coating that encapsulates the electronics unit and is in direct contact with the flooded water.

18. The thruster of claim 16, wherein the stator assembly further includes a base and a bearing tube that supports the stator and contains bearings, wherein the bearing tube and the base are formed as a unitary member.

19. The thruster of claim 16, wherein the rotor assembly further includes a ferrous ring within which the plurality of magnets are disposed, and wherein the ferrous ring acts to contain and focus the magnetic flux of the magnets and the magnetic flux of the stator and windings when the thruster is in use.

* * * * *